US012215758B2

(12) United States Patent
Bjørgum

(10) Patent No.: US 12,215,758 B2
(45) Date of Patent: Feb. 4, 2025

(54) SHACKLE LOCK AND SHACKLE COMPRISING SAID SHACKLE LOCK

(71) Applicant: Hylestad Solutions AS, Rysstad (NO)

(72) Inventor: Kjetil Bjørgum, Kristiansand (NO)

(73) Assignee: Hylestad Solutions AS, Rysstad (NO)

( * ) Notice: Subject to any disclaimer, the term of this patent is extended or adjusted under 35 U.S.C. 154(b) by 261 days.

(21) Appl. No.: 17/912,961

(22) PCT Filed: Mar. 25, 2021

(86) PCT No.: PCT/NO2021/050080
§ 371 (c)(1),
(2) Date: Sep. 20, 2022

(87) PCT Pub. No.: WO2021/194354
PCT Pub. Date: Sep. 30, 2021

(65) Prior Publication Data
US 2023/0130421 A1 Apr. 27, 2023

(30) Foreign Application Priority Data
Mar. 25, 2020 (NO) .................................. 20200353

(51) Int. Cl.
*F16G 15/06* (2006.01)
*F16G 15/04* (2006.01)
(52) U.S. Cl.
CPC ............. *F16G 15/06* (2013.01); *F16G 15/04* (2013.01)
(58) Field of Classification Search
CPC .. F16G 15/04; F16G 15/06; Y10T 403/32893; Y10T 403/598; Y10T 403/599

USPC ....................................................... 59/85, 86
See application file for complete search history.

(56) References Cited

U.S. PATENT DOCUMENTS

| 1,419,974 | A | 6/1922 | McLaughlin |
| 3,680,906 | A | 8/1972 | Neumeier et al. |
| 4,068,960 | A | 1/1978 | Swager |
| 4,102,124 | A | 7/1978 | Swager |

(Continued)

FOREIGN PATENT DOCUMENTS

| DE | 3136848 | 3/1983 |
| EP | 1766166 | 8/2012 |

(Continued)

OTHER PUBLICATIONS

Norwegian Search Report for No. 20200353, dated Oct. 21, 2020.
International Search Report and the Written Opinion for PCT/NO2021/050080, dated May 14, 2021.

*Primary Examiner* — Jared O Brown
(74) *Attorney, Agent, or Firm* — Andrus Intellectual Property Law, LLP

(57) ABSTRACT

A shackle lock for positioning on a shackle body, the shackle lock has a housing, at least one locking body and a sleeve which is displaceable in an axial direction of the housing. The housing is adapted for connection to the shackle body and is arranged to house a first end of a shackle pin. The at least one locking body is arranged to engage with a locking groove at the first end of the shackle pin. The sleeve, in a locking position, is arranged to keep the at least one locking body in the groove, and, in a releasing position, is arranged to release the at least one locking body from the groove. A shackle in which a shackle lock is arranged on an outside of the first end of the shackle body is described as well.

19 Claims, 7 Drawing Sheets

(56) References Cited

U.S. PATENT DOCUMENTS

| | | | |
|---|---|---|---|
| 4,204,711 A | 5/1980 | Lancelot et al. | |
| 4,863,205 A | 9/1989 | Delonghi et al. | |
| 5,046,881 A * | 9/1991 | Swager | F16G 15/06 |
| | | | 59/86 |
| 2005/0276658 A1 | 12/2005 | Silva | |
| 2006/0099838 A1 | 5/2006 | Meyers et al. | |
| 2013/0074469 A1 | 3/2013 | Robins | |
| 2016/0348712 A1* | 12/2016 | Stolz | F16G 15/06 |
| 2018/0274630 A1* | 9/2018 | Betzler | F16G 15/06 |
| 2018/0274631 A1* | 9/2018 | Betzler | F16G 15/06 |
| 2019/0070443 A1* | 3/2019 | Hetrich | A62B 35/0037 |
| 2019/0376254 A1* | 12/2019 | Stolz | F16G 15/06 |

FOREIGN PATENT DOCUMENTS

| | | |
|---|---|---|
| EP | 3163120 | 5/2017 |
| FR | 1118908 | 6/1956 |
| GB | 133610 | 11/1919 |
| KR | 20120131882 | 12/2012 |
| WO | 8900249 | 1/1989 |
| WO | 2009/149503 | 12/2009 |
| WO | 2016/153196 | 9/2016 |
| WO | 2018/220512 | 12/2018 |
| WO | 2019236675 | 12/2019 |

* cited by examiner

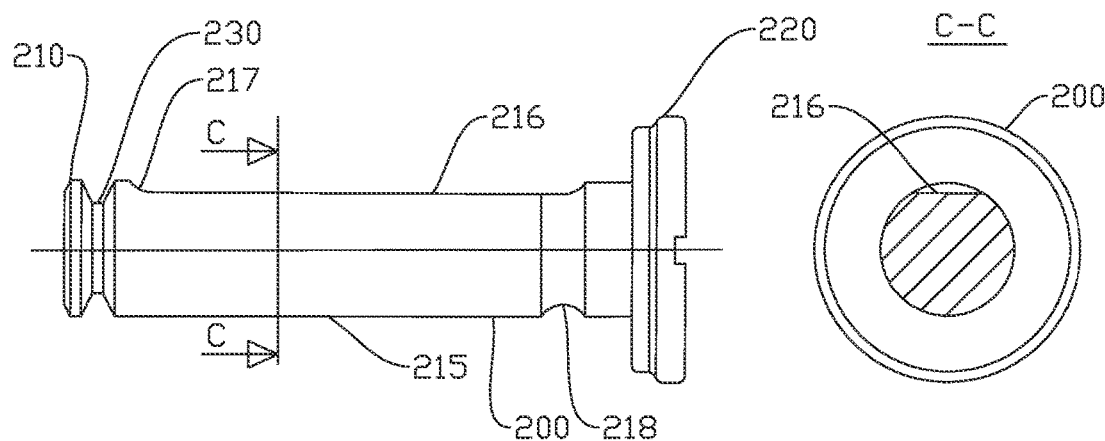
Fig. 10                     Fig. 11
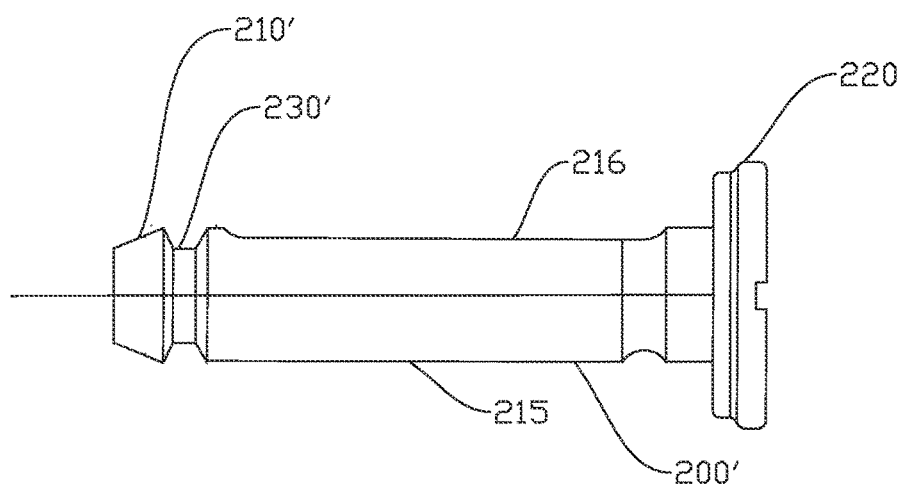
Fig. 12

SHACKLE LOCK AND SHACKLE COMPRISING SAID SHACKLE LOCK

CROSS-REFERENCE TO RELATED APPLICATIONS

This application is the U.S. national stage application of International Application PCT/NO2021/050080, filed Mar. 25, 2021, which international application was pub-lished on Sep. 30, 2021, as International Publication WO 2021/194354 in the English language. The International Application claims priority of Norwegian patent Application No. 20200353, filed Mar. 25, 2020. The international application and Norwegian application are both incorporated herein by reference, in entirety.

FIELD

The invention relates to a lock for a shackle pin, more specifically a shackle lock arranged to be positioned on the outside of a shackle body. The invention also relates to a shackle comprising said shackle lock and a locking device comprising the shackle pin and the shackle lock.

BACKGROUND

A shackle is typically used for joining chains or for attaching blocks, hooks, rigs and the like to a chain, rope or wire. Shackles are found in many sizes and are intended for loads from a few kilos to several hundred tonnes.

A conventional shackle comprises a U-shaped shackle body and a shackle pin. The shackle body comprises a first end and an opposite second end, the first end and the second end being provided with corresponding cut-outs for the shackle pin.

The shackle pin comprises a first end and a second end, the first end being arranged to be passed through the corresponding cut-outs, and the second end being arranged to abut supportingly against an outside of the first end or the second end of the shackle body so that the shackle pin is locked in a first axial direction.

To lock the shackle pin in a second axial direction, it is known to fit a locking pin and/or a nut at the first end of the shackle pin. The patent document KR20120131882A discloses an example of such a solution. It is also known to provide the shackle pin with two externally threaded portions arranged to engage with two corresponding threaded portions at the first and second ends of the shackle body.

The patent document GB133610 discloses a shackle pin provided with an axial and helical groove arranged to engage with a corresponding guiding peg in one of the cut-outs of the shackle body. The shackle pin is locked by the peg and the groove rotating the shackle pin through 360 degrees during the last part of the insertion.

In a conventional shackle, the shackle pin is releasable from the shackle body. Therefore, the shackle pin must be secured to the shackle body with a safety chain.

In major lifting operations, the shackle must often be connected above the body that is to be lifted, and there is often a person in the immediate vicinity of the coupling. An operation like that typically involves the shackle body hanging on a first rope, where-after the operator must lift up and position a second rope in the shackle body, and at the same time fit the shackle pin into the shackle body. This operation is considered as critical in many cases and a more user-friendly and safer shackle is therefore sought.

SUMMARY

The invention has for its object to remedy or reduce at least one of the drawbacks of the prior art or at least provide a useful alternative to the prior art.

The object is achieved through the features that are specified in the description below and in the claims that follow.

The invention is defined by the independent claims. The dependent claims define advantageous embodiments of the invention.

In a first aspect, the invention relates more specifically to a shackle lock for positioning on a shackle body, the shackle lock comprising a housing, at least one locking body and a displaceable sleeve which is displaceable in an axial direction of the housing. The housing is arranged to be connected to the shackle body and is arranged to house a first end of a shackle pin. The at least one locking body is arranged to engage with a peripheral locking groove at the first end of the shackle pin. The sleeve, in a locking position, is arranged to keep the at least one locking body in the groove, and is arranged, in a releasing position, to disengage the at least one locking body from the groove.

In an advantageous embodiment, the first end of the shackle pin which is described herein may have a circular cross section which corresponds to an internal circular cut-out in the housing. By a peripheral groove is understood, herein, a radial groove en-circling the shackle pin.

The sleeve surrounds a portion of the housing. When the sleeve is in the first locking position, the at least one locking body is in an engaged position in the groove of the shackle pin when the shackle pin is positioned in the housing. The at least one locking body may be in the engaged position even when the shackle pin is not positioned in the housing.

To be able to move the shackle pin into the housing or out of the shackle lock, the at least one locking body must be released from the engaged position. The at least one locking body may be released from the engaged position by pulling the sleeve backwards in the axial direction of the housing, away from the shackle body.

In a first embodiment, the sleeve may be freely displaceable in a first axial direction and an opposite second axial direction. This gives a simple design of the shackle lock, in which the sleeve is slid manually between the locking position and the releasing position.

To prevent the freely displaceable sleeve from sliding unintendedly, the sleeve and the housing may comprise a device for keeping the sleeve in the locking position and/or the releasing position. Such a safety device may, for example, be an L-shaped, J-shaped or U-shaped guiding groove in the housing or sleeve, said guiding groove engaging with a corresponding guiding peg in the other one of the housing and sleeve. Thereby the sleeve must first be rotated before it can be displaced.

The shackle lock may be self-locking.

The effect of the shackle lock being self-locking is that the at least one locking body engages automatically with the groove, and that the sleeve is then moved automatically into the locking position when the shackle pin is positioned in the shackle lock. This simplifies the locking of the shackle pin and increases safety because the operator does not have to carry out an active action to position the at least one locking body in the engaged position. Such a locking of the shackle pin is referred to as a passive locking.

Unlike a passive locking, an active locking will typically include the use of separate locking elements such as a nut or a split-pin, or the use of a tool.

The shackle lock may be arranged to release the at least one locking body automatically when the shackle pin is being inserted into the shackle lock, in that the first end of the shackle pin comprises a cone arranged to force the at least one locking body outwards and thereby the sleeve backwards. When the cone has passed the at least one locking body, the at least one locking body will go into an engaged position so that the shackle pin cannot be pulled out. This principle is known to be used in hydraulic quick-release couplings, among other things.

The shackle lock may comprise a spring arranged to keep the sleeve in the locking position.

The effect of the spring is that the sleeve is biased into the locking position so that the at least one locking body is kept in the engaged position as long as the sleeve is not subjected to a force of opposite direction greater than the spring force, for example by the sleeve being pulled back by means of hand power.

When the shackle pin is to be released from the shackle lock, the sleeve is pulled away from the shackle body so that the at least one locking body is released and can be forced radially outwards when the shackle pin is pulled out of the shackle lock.

The sleeve may be kept in the locking position by means of a push force provided by a pressurized fluid. The fluid may be oil. The fluid may alternatively be a gas, typically air.

A hydraulic or pneumatic spring force may be relevant in larger locks, in which the dimensions of the shackle lock and the sleeve are so large that it may be difficult or impractical to operate the sleeve manually. The fluid pressure may, for example, be provided by means of a prior-art actuator. The actuator may be linear. The actuator may be a rotating one.

The at least one locking body may be a ball.

The effect of the at least one locking body being a ball is that the shackle lock may include a plurality of locking bodies which are radially movable between a releasing, outer position and an inner locking position. The solution with several balls as described herein is known to have been used in, for example, hydraulic quick-release couplings and is a proven and safe solution.

In an alternative embodiment, the at least one locking body may be an annular spring with an open portion, the annular spring being expandable from a smallest diameter to a largest diameter.

In a further alternative embodiment, the at least one locking body may be a bail adapted for radial displacement between a locking position and a releasing position. The bail may be spring-loaded into the locking position.

The shackle lock may comprise a threaded portion arranged to engage with a corresponding threaded portion of a shackle body.

The effect of a threaded connection as is described herein is that the shackle lock May be formed as a separate component for retrofitting to a shackle body with a corresponding threaded portion. Another advantage of a threaded connection is that the shackle lock may be replaced on possible wear or damage.

An advantageous threaded connection may comprise an externally threaded portion on the housing and a corresponding internally threaded portion in the shackle body.

By the threaded portion of the shackle body being an internal one, the threaded portion of the shackle body may be formed without having to add a projecting portion to the shackle body.

In an alternative embodiment, the shackle lock may be adapted for permanent attachment to the shackle body. By permanent attachment may be understood, herein, that a portion of the shackle lock is attached to the shackle body by, for example, heat treatment or a press fit, and that said locking portion cannot be separated from the shackle body without the use of heat or a cutting tool.

In a further alternative embodiment, the housing of the shackle lock may be formed of a projecting portion belonging to the shackle body. The projecting portion may be formed as part of a moulding process for the shackle body.

The effect of the shackle lock being permanently attached to the shackle body is that a joining of the housing and shackle body which is stronger than a threaded connection may be provided. Further, machining of the inside of the housing may happen at the same time as holes for the shackle pin are machined in the shackle body.

In a second aspect, the invention relates more specifically to a shackle comprising a shackle body and shackle pin, and a shackle lock in accordance with the first aspect of the invention. The shackle lock is arranged on an outside of the first end of the shackle body, the shackle lock being arranged axially coincidingly with the cut-outs of the shackle body, and the shackle lock projecting from the first end of the shackle body in a direction away from the second end of the shackle body. The shackle pin is provided with a peripheral locking groove at a first end of the shackle pin, the peripheral locking groove being arranged to engage with at least one locking body belonging to the shackle lock.

By an outside may be understood, herein, a face comprising a cut-out for a shackle pin. The shackle lock is positioned on an outside of the first end.

The effect of a shackle comprising a shackle lock as is described herein is that a sim-pler and safer use of shackles than that of the prior art may be provided.

The shackle lock may be releasably attached to the shackle body. The shackle lock may be permanently attached to the shackle body.

By releasably attached may be understood, herein, that the shackle lock may be fitted to the shackle body and removed from the shackle body, for example via a threaded connection. The threaded connection may comprise an externally threaded portion on the shackle lock and an internally threaded portion in the shackle body. The externally threaded portion of the shackle lock may be formed in a housing belonging to the shackle lock.

The shackle may comprise a shackle pin with a peripheral locking groove at the first end of the shackle pin, the peripheral locking groove being arranged to engage with at least one locking body belonging to the shackle lock.

The effect of the peripheral locking groove is that the shackle pin can be locked in an axial direction without the use of separate locking means such as a locking pin or a nut.

The peripheral locking groove of the shackle pin may have a width arranged to give the locking body moving space in the axial direction of the shackle pin.

By width may be understood, herein, a recess in a radial direction of the shackle pin. Said moving space is achieved when the width of the groove is larger than the width of the locking body measured in the axial direction of the shackle pin.

An effect of the peripheral locking groove having a width arranged to give the locking body moving space in the axial direction of the shackle pin is that the shackle pin can be moved in a limited axial direction. In technical language, this movement is referred to as slack. Slack may be advantageous because it may help to transmit loads from the at least one locking body and groove to an abutment surface between the shackle pin and the shackle body.

By the shackle pin including the locking groove, a lockable shackle pin without any movable parts may be provided, as the movable parts for locking the shackle pin to the shackle are arranged in the housing. Thereby a shackle with a lockable shackle pin may be provided in which movable parts belonging to the lock, for example balls and springs, may be positioned in a protected manner inside the housing.

The shackle pin may include a recess with a first end arranged to engage with a corresponding stop at the second end of the shackle body, a shackle lock being arranged at the first end of the shackle body. The recess may be plane.

The effect of the recess is that the shackle pin cannot unintendedly be pulled out of the shackle body, and that it is only possible to pull the shackle pin out of the shackle lock when the flat of the recess is parallel to the stop. This gives an additional safety device for the shackle pin.

When the shackle is being used, a connected strap or a rope should rest against the curved surface of the shackle pin and as little as possible in the transition between the recess and the curved surface. Said transition is preferably rounded but may cause an undesired point load on straps and ropes. Therefore, in use, it is natural to orient the shackle pin in such a way that the flat of the recess faces in the direction of force of the strap or rope. In normal use, this direction will be perpendicular to the stop, so that the flat of the recess will not be parallel to the stop.

When fitting and removing the shackle pin, the stop may be removed.

In a second end, the shackle pin may comprise a radial recess adapted for rotatable engagement with the stop.

The effect of the radial recess is that the shackle pin may rotate around its centre axis when the peripheral locking groove of the shackle pin is in a locking engagement with the shackle lock. Further, when in engagement with the radial groove, the stop will give an extra axial locking of the shackle pin.

In a further aspect, the invention relates to a locking device for a shackle, the locking device comprising a shackle pin and a shackle lock in accordance with the first aspect of the invention, and at least one of a first safety function and a second safety function for the shackle pin:
- the first safety function comprising the stop positioned in the shackle body and against the recess of the shackle pin, and the first end belonging to the recess being arranged to engage with the stop so that the shackle pin is prevented from being pulled out of the shackle body; and
- the second safety function comprising the stop and the radial recess in the shackle pin, the stop being arranged to prevent axial movement of the shackle pin when the shackle pin is positioned in such a way that the recess does not correspond with the stop.

BRIEF DESCRIPTION OF THE DRAWINGS

In what follows, examples of preferred embodiments are described, which are visual-ized in the accompanying drawings, in which:

FIG. 10 shows a first embodiment of the shackle pin;

FIG. 11 shows a section C-C of the shackle pin of FIG. 10; and

FIG. 12 shows an alternative embodiment of the shackle pin according to FIG. 10.

DETAILED DESCRIPTION OF THE DRAWINGS

Figure 1:
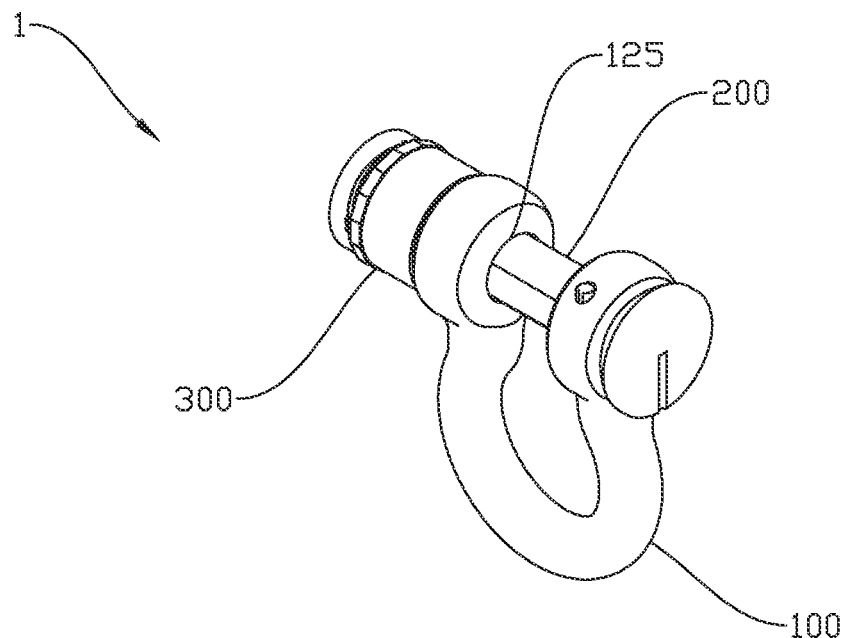
FIG. 1 shows, in perspective, a shackle comprising a shackle lock arranged on a shackle body, and a shackle pin in a locking position.
Figure 2:
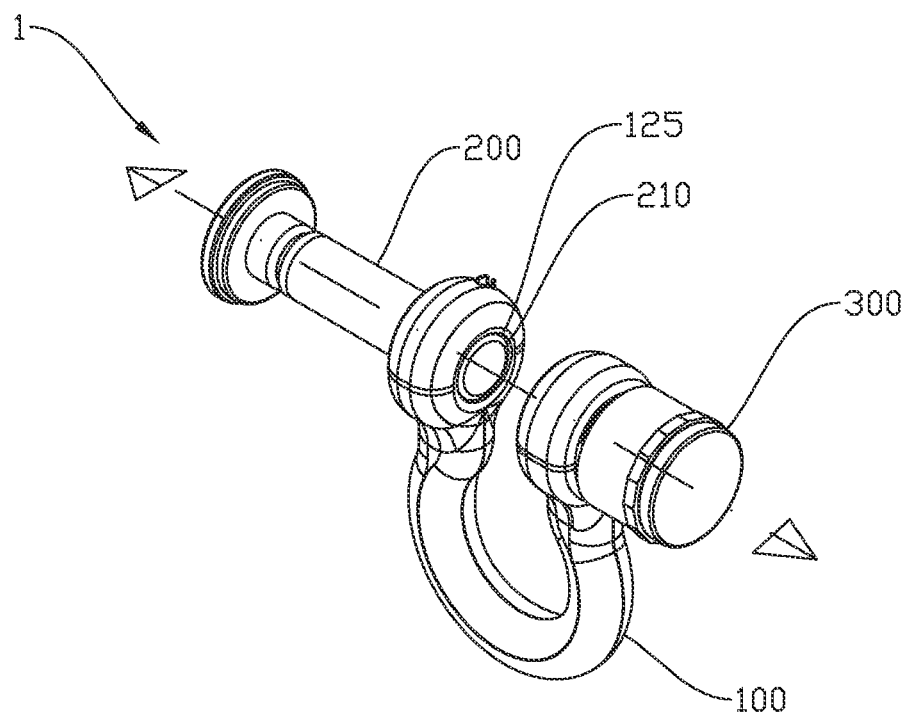
FIG. 2 shows the shackle of FIG. 1 in a releasing position and from a different angle.
Figures 3, 4:
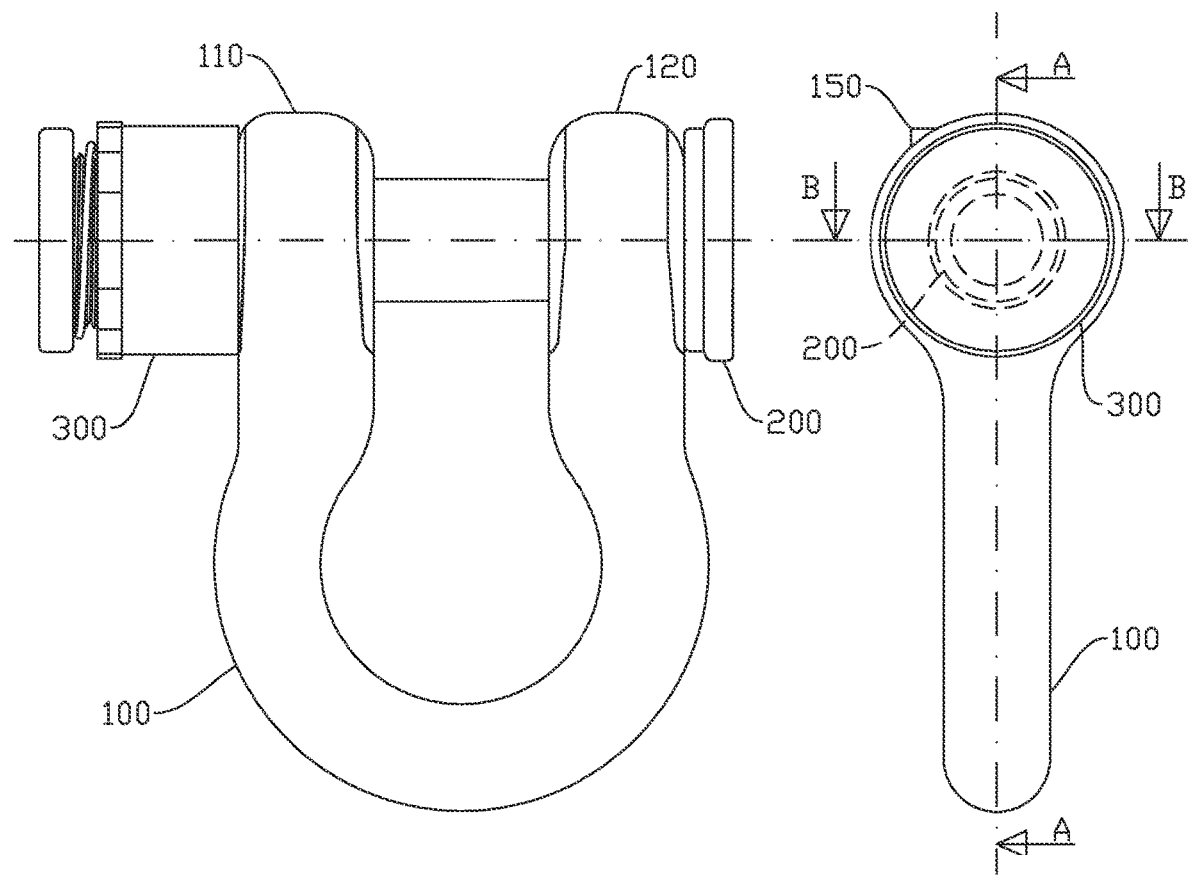
FIG. 3 shows the shackle on a larger scale, seen from the front.
FIG. 4 shows the shackle from the side.

Reference is made first to FIGS. 1-6: A shackle lock 300 is positioned on the outside of a shackle body 100, the shackle lock 300 comprising a housing 305, at least one locking body 310 and a displaceable sleeve 320, the housing 305 being arranged to house a first end 210 of a shackle pin 200. The at least one locking body 310 is arranged to engage with a peripheral locking groove 230 at the first end 210 of the shackle pin 200. The sleeve 320, in a locking position (FIGS. 1, 3 and 5), is arranged to keep the at least one locking body 310 in the groove 230, and is arranged, in a releasing position (FIGS. 2 and 6), to release the at least one locking body 310 from the groove 230. The shackle body 100, shackle pin 200 and shackle lock 300 consti-tute a shackle 1.

The shackle body 100 comprises a first end 110 and a second end 120 with axially coinciding cut-outs 125 adapted for the insertion of the shackle pin 200. In a first embodiment, the shackle lock 300 is attached to the first end 110 via a threaded connection. The housing 305 comprises an outer threaded portion 330 arranged to engage with an internally threaded portion 130 at the first end 110 of the shackle body 100.

In this embodiment, the shackle lock 300 comprises a housing 305, an end cap 306, a sleeve 320, a first spring 325, a second spring 326 and a plurality of locking bodies 310, shown in the figures as balls.

The shackle pin 200 comprises a first end 210, a coupling portion 215 and a second end 220. The first end 210 and the coupling portion 215 are separated by a peripheral groove 230 arranged to receive at least one locking body 310.

Figure 6:
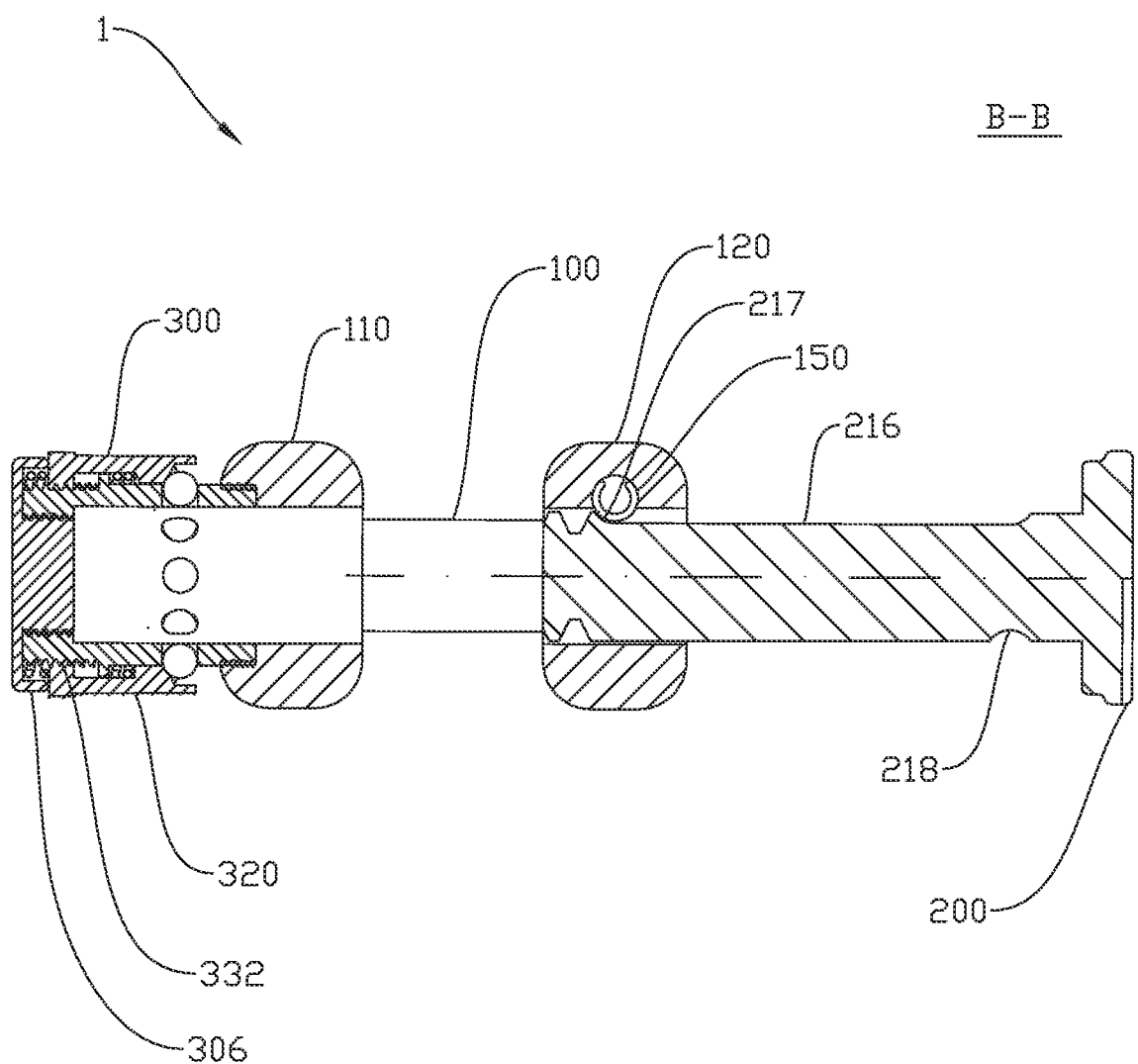
FIG. 6 shows a horizontal section B-B of the shackle of FIG. 5, the shackle pin being in the releasing position.

In one embodiment, the second end 120 of the shackle body 100 includes a recess for a stop 150 arranged to prevent the shackle pin 200 from being pulled out of the shackle body 100 by accident. In FIG. 6, the stop 150 is shown as a tension pin. The stop 150 may be removed when the shackle pin 200 is being installed and removed.

The springs 325 and 326 push the sleeve 320 towards the shackle body 100, so that an abutment surface 321 keeps the balls 310 in a position of engagement with the groove 230 belonging to the shackle pin 200. When the shackle pin 200 is to be released, the sleeve 320 is pulled towards the end cap 306 so that the balls 310 can be disengaged and forced outwards by the shackle pin. The sleeve 320 is shown with a cone 322 arranged to push the balls 310 into the groove 230 when the shackle pin 200 is to be locked.

Figure 5:
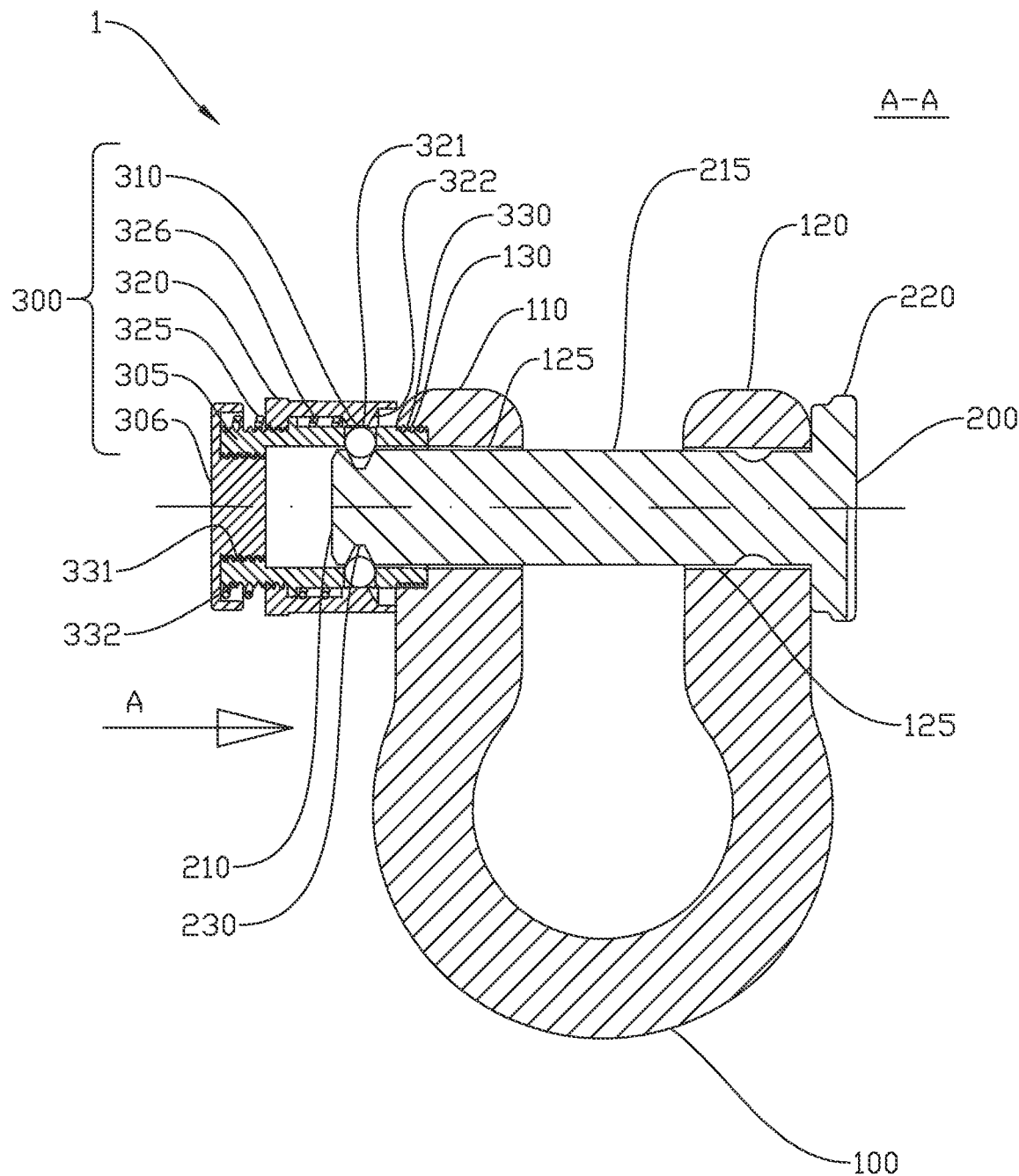
FIG. 5 shows a vertical section A-A of the shackle in which the shackle lock is screwed to the shackle body.

In FIGS. 5 and 6, a second threaded portion 332 between the housing 305 and the sleeve 320 is shown. The second threaded portion 332 is arranged to guide and keep the sleeve 320 in a retracted position as shown in FIG. 6. It is pointed out that the threaded portion 332 shown in FIGS. 5 and 6 is only illustrative and that real threads may be of a different design from the one shown in the figures.

Figure 7:
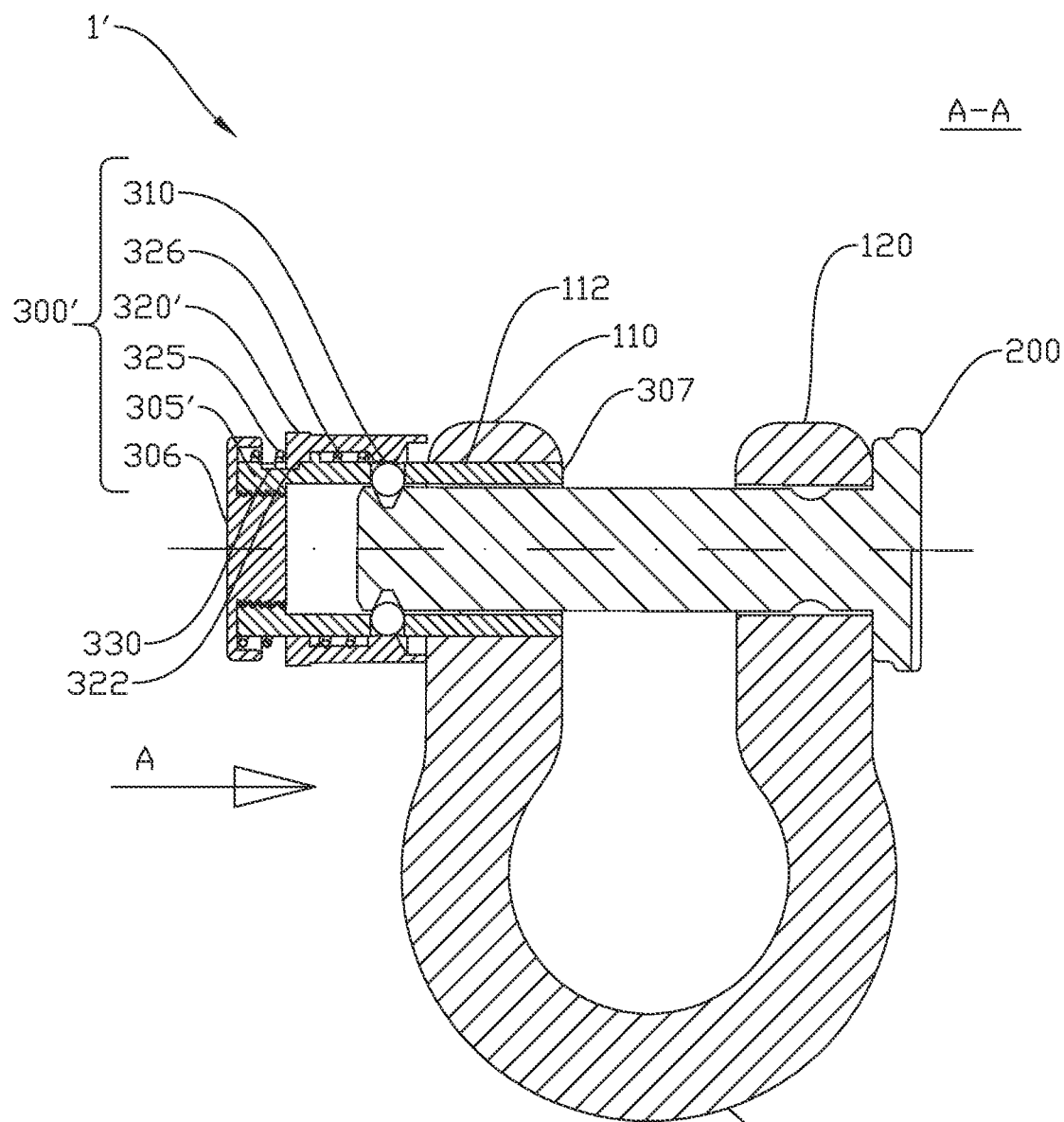
FIG. 7 shows a vertical section A-A of the shackle in which the shackle lock has been press-fitted to the shackle body.
Figure 8:
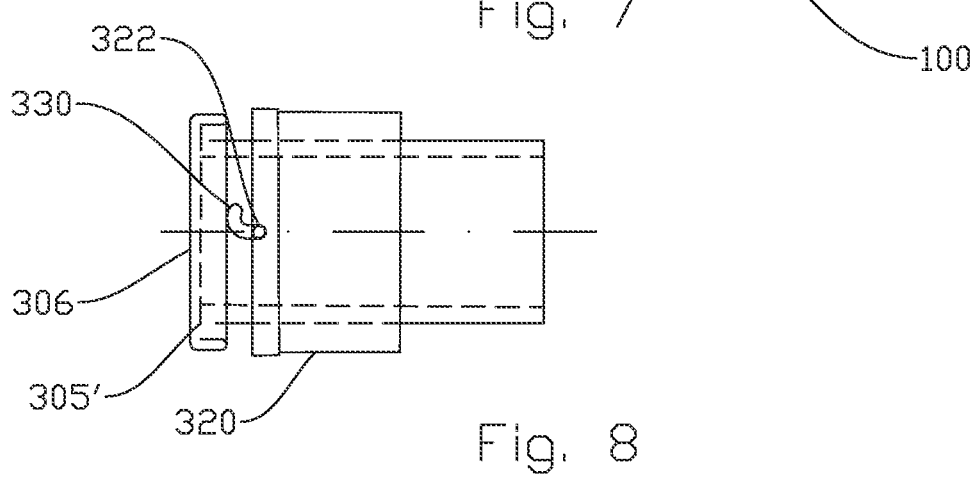
FIG. 8 shows a housing and a sleeve with a guiding groove.

FIGS. 7 and 8 show an alternative embodiment of the shackle lock 300, in which the housing 305' is attached to the shackle body 100 by a press fit, the housing 305' of the shackle lock 300 having been extended by an engagement portion 307 arranged to engage with a corresponding cut-out 112 in the shackle body 100. Further, the housing 305" is shown with a guiding groove 330 shaped like an L or a J, arranged to engage with a corresponding guiding peg 322 arranged in a radially inward-projecting manner on the sleeve 320 (see FIG. 8).

FIG. 8 shows the housing 305' with the guiding groove 330 and the sleeve 320 with the guiding peg 322. When the sleeve 320 is pulled backwards and towards the end cap 306, the guiding groove 330 and the guiding peg 322 will guide the sleeve first in an axial direction and then in a circumferential direction. When the guiding peg 322 has been moved to the end of the guiding groove 330, the sleeve 320 will be kept in a releasing position so that the shackle pin 200 can be moved freely in and out of the shackle lock 300'.

Figure 9:
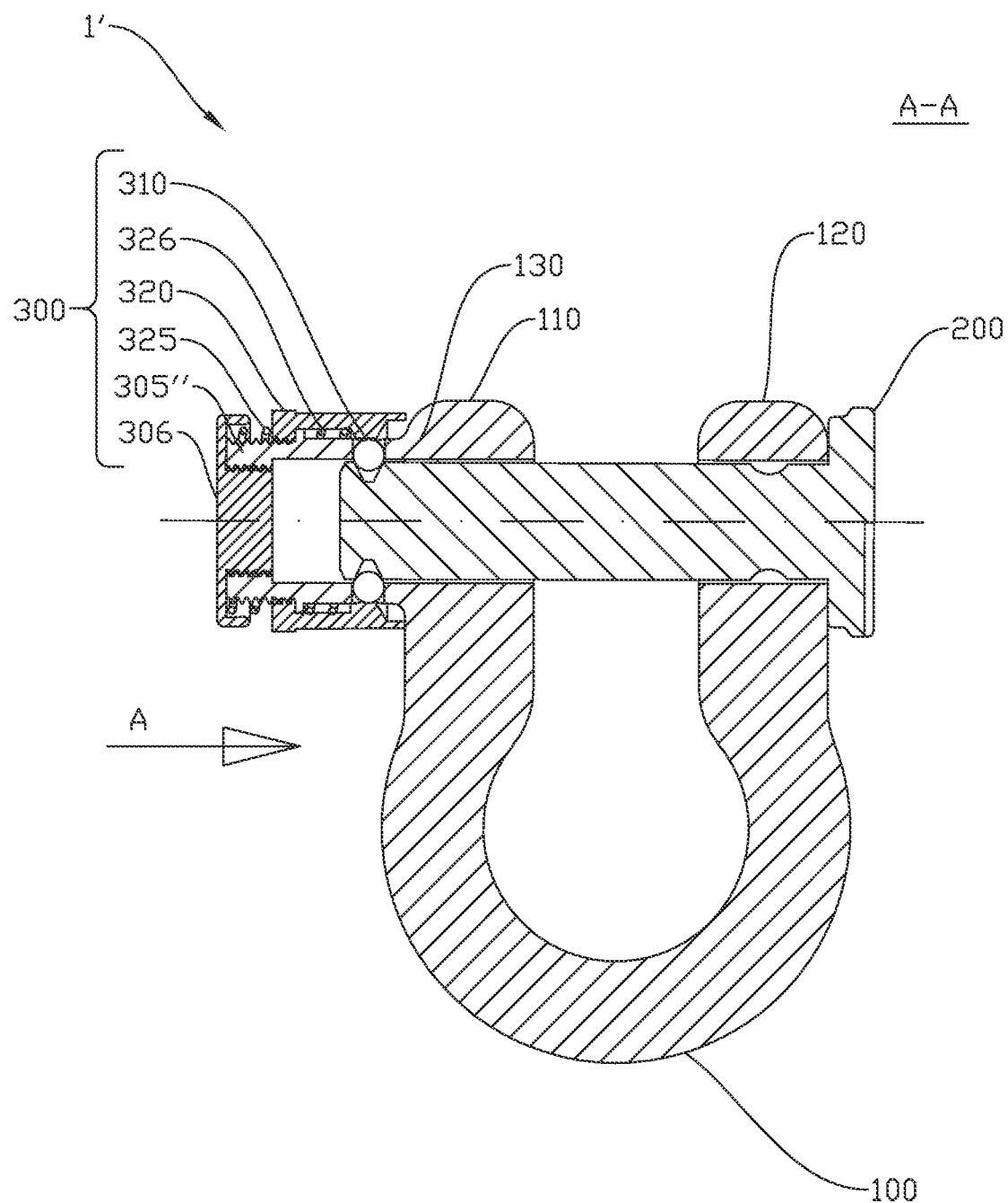
FIG. 9 shows a vertical section A-A of the shackle in which a housing belonging to the shackle lock is part of the shackle body.

FIG. 9 shows a third embodiment of the shackle lock 300, in which the housing 305" is part of the shackle body 100. Other components belonging to the shackle lock 300 are the same as those shown in the other figures.

FIGS. 10 and 11 show the shackle pin 200 with a plane recess 216 with a first end 217 arranged to engage with the stop 150 shown in FIG. 6. The shackle pin 200 is further shown with a radial recess 218 adapted for rotatable engagement with the stop 150. The radial recess 218 makes it possible for the shackle pin 200 to rotate around its own axis. The radial recess 218 also functions as an additional safety device as the stop 150 will prevent axial movement of the shackle pin 200, except when the shackle pin 200 is positioned in such a way that the plane recess 216 corresponds with the stop 150 as shown in FIG. 6. For the shackle pin 200 to be releasable from the shackle lock 300, the shackle pin 200 must have a radial position like the one shown in FIG. 6. A person skilled in the art will understand that the recess 216 and the corresponding stop 150 are an advantageous embodiment, and not obligatory for the invention.

FIG. 12 shows an alternative embodiment of the shackle pin 200', in which the peripheral locking groove 230' is elongated in the axial direction of the shackle pin 200, and the first end portion 210' has a larger cone. The elongated locking groove 230' and the coned end 210' enable the shackle pin 200' to engage self-lockingly with the shackle lock 300.

The invention described herein can provide a locking device comprising the shackle pin 200 and the shackle lock 300, and at least one safety function for the shackle pin 200. The at least one safety function may be a first safety function or a second safety function.

The first safety function may comprise the stop 150 positioned in the shackle body 100 and against the recess 216 of the shackle pin 200, the first end 217 belonging to the recess 216 being arranged to engage with the stop 150 so that the shackle pin 200 is prevented from being pulled out of the shackle body 100.

The second safety function may comprise the stop 150 and the radial recess 218 of the shackle pin 200, the stop 150 being arranged to prevent axial movement of the shackle pin 200 when the shackle pin 200 is positioned in such a way that the recess 216 does not correspond with the stop 150.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive. Embodiments and reference numbers marked with 'and" refers to elements with a similar function, but with different designs.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A shackle lock for positioning on a shackle body, the shackle lock comprising:
　a housing,
　at least one locking body, and
　a sleeve which is displaceable in an axial direction relative to the housing, wherein:
　　the housing is part of or adapted for connection to the shackle body and is arranged to house a first end of a shackle pin;
　　the at least one locking body is arranged to engage with a locking groove at the first end of the shackle pin;
　　the sleeve is displaceable relative to the housing into a locking position in which the sleeve retains the at least one locking body in the locking groove to thereby lock the shackle pin to the shackle body; and
　　the sleeve is alternately displaceable relative to the housing into a releasing position in which the at least one locking body is free to be moved from the locking groove to thereby unlock the shackle pin from the shackle body.

2. The shackle lock in accordance with claim 1, the shackle lock being self-locking.

3. The shackle lock in accordance with claim 1, wherein the shackle lock comprises a spring arranged to keep the sleeve in the locking position.

4. The shackle lock in accordance with claim 1, wherein the at least one locking body is a ball.

5. A shackle comprising:
　a shackle body with a first end and a second end with axially coinciding cut-outs adapted for an insertion of a shackle pin, wherein:
　　a shackle lock in accordance with claim 1 is arranged on an outside of the first end of the shackle body, the shackle lock being arranged axially coincidingly with the cut-outs of the shackle body, and the shackle lock projecting from the first end of the shackle body in a direction away from the second end of the shackle body; and
　　the shackle pin is provided with the locking groove at the first end of the shackle pin, the locking groove being arranged to engage with the at least one locking body belonging to the shackle lock.

6. The shackle in accordance with claim 5, wherein a peripheral locking groove of the shackle pin has a width arranged to give the locking body a moving space in an axial direction of the shackle pin.

7. The shackle in accordance with claim 6, wherein the shackle pin includes a plane recess with a first end arranged to engage with a corresponding stop at the second end of the shackle body.

8. The shackle in accordance with claim 6, wherein the shackle pin, at a second end, includes a radial recess arranged to engage with a stop by rotation of the shackle pin.

9. The shackle in accordance with claim 5, wherein the shackle pin includes a plane recess with a first end arranged to engage with a corresponding stop at the second end of the shackle body.

10. The shackle in accordance with claim 9, wherein the shackle pin, at a second end, includes a radial recess arranged to engage with the corresponding stop by rotation of the shackle pin.

11. The shackle in accordance with claim 5, wherein the shackle pin, at a second end, includes a radial recess arranged to engage with a corresponding stop by rotation of the shackle pin.

12. The shackle lock in accordance with claim 1, wherein the sleeve is axially displaceable relative to the locking body.

13. A locking device for a shackle, wherein the locking device comprises a shackle lock in accordance with claim 1 and a shackle pin configured for engagement with the shackle lock.

14. The locking device in accordance with claim 13, the locking device comprising at least one of a first safety function and a second safety function for the shackle pin, wherein:
   the first safety function comprises a stop positioned in a shackle body of the shackle lock and against a recess of the shackle pin, and a first end belonging to the recess is arranged to engage with a stop so that the shackle pin is prevented from being pulled out of the shackle body; and
   the second safety function comprises the stop and a radial recess of the shackle pin, the stop being arranged to prevent an axial movement of the shackle pin when the shackle pin is positioned in such a way that the recess does not correspond with the stop.

15. A locking device for a shackle, the locking device comprising:
   a shackle pin,
   a shackle lock configured to engage the shackle pin with the shackle, the shackle lock including
      a housing configured to receive the shackle pin,
      a locking body retained by the housing, and
      a sleeve that is axially displaceable relative to the housing into and between a locking position in which the locking body is locked between the sleeve and the shackle pin and a releasing position the locking body not contained between the sleeve and the shackle pin,
   wherein in the locking position the shackle pin is locked to the shackle and in the releasing position the shackle pin is removable from the shackle.

16. The locking device in accordance with claim 15, wherein the sleeve is spring biased towards the locked position.

17. A method of operating the locking device in accordance with claim 15, comprising applying a fluid pressure to move the sleeve into the releasing position.

18. A shackle lock comprising a shackle body and the locking device in accordance with claim 15.

19. A shackle lock for positioning on a shackle body, the shackle lock comprising:
   a housing,
   at least one locking body, and
   a sleeve which is displaceable in an axial direction of the housing, wherein;
      the housing is adapted for connection to the shackle body and is arranged to house a first end of a shackle pin;
      the at least one locking body is arranged to engage with a locking groove at the first end of the shackle pin; and
      the sleeve, in a locking position, is arranged to keep the at least one locking body in the locking groove and, in a releasing position, is arranged to release the at least one locking body from the locking groove, and
   wherein the shackle lock comprises a threaded portion arranged to engage with a corresponding threaded portion in the shackle body.

* * * * *